United States Patent
Miyoshi

(10) Patent No.: US 6,862,410 B2
(45) Date of Patent: Mar. 1, 2005

(54) STEREOADAPTER, PATTERN PROJECTION ADAPTER, AND ADAPTER FOR LIGHT-EMITTING MEMBER

(75) Inventor: Takashi Miyoshi, Hachioji (JP)

(73) Assignee: Olympus Corporation, Tokyo (JP)

( * ) Notice: Subject to any disclaimer, the term of this patent is extended or adjusted under 35 U.S.C. 154(b) by 48 days.

(21) Appl. No.: 10/072,110

(22) Filed: Feb. 8, 2002

(65) Prior Publication Data

US 2002/0118970 A1 Aug. 29, 2002

(30) Foreign Application Priority Data

Feb. 9, 2001 (JP) ........................................ 2001-034392

(51) Int. Cl.$^7$ .......................... G03B 35/00; G03B 41/00
(52) U.S. Cl. ...................................... 396/331; 396/333
(58) Field of Search ................................ 396/324, 331, 396/333, 199, 544, 351; 353/7; 352/57, 65; 359/462, 464, 465, 466, 494, 63, 472, 473, 480, 487, 386, 497; 348/49, 51, 57, 42

(56) References Cited

U.S. PATENT DOCUMENTS

| | | | | |
|---|---|---|---|---|
| 2,290,793 A | * | 7/1942 | Alderman ..................... | 396/16 |
| 4,695,130 A | * | 9/1987 | Medina et al. ............... | 359/464 |
| 5,570,150 A | * | 10/1996 | Yoneyama et al. ......... | 396/324 |
| 5,946,500 A | * | 8/1999 | Oles .............................. | 396/3 |
| 6,567,682 B1 | * | 5/2003 | Osterweil et al. ........... | 600/407 |

FOREIGN PATENT DOCUMENTS

| | | |
|---|---|---|
| JP | 4-25758 | 5/1992 |
| JP | 9-281614 | 10/1997 |

* cited by examiner

*Primary Examiner*—Judy Nguyen
*Assistant Examiner*—Rochelle Blackman
(74) *Attorney, Agent, or Firm*—Scully, Scott, Murphy & Presser

(57) ABSTRACT

A stereoadapter is mounted in front of an imaging optical system of a camera to photograph a parallax image. An optical system has two light-receiving modules spaced apart from each other by a predetermined distance to receive light from the same object. Then, the optical system directs light received by each of the two light-receiving modules to the imaging optical system of the camera. A light-emitting module is provided at a predetermined position associated with the optical system and can emit light for illuminating the object.

10 Claims, 6 Drawing Sheets

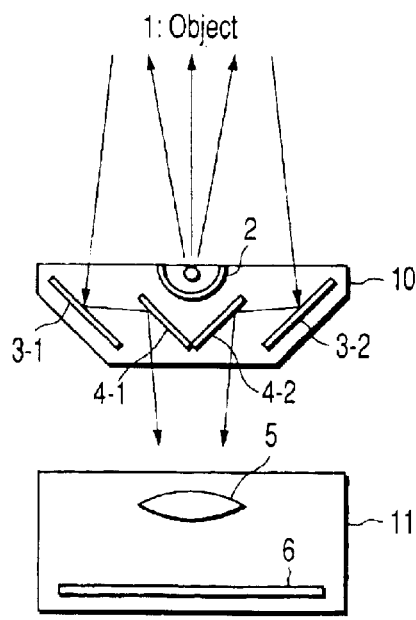
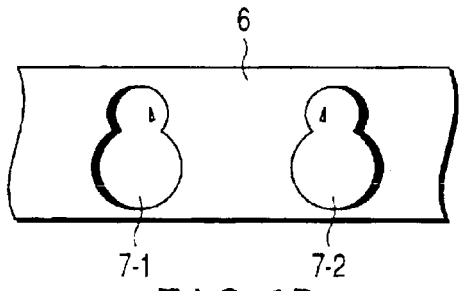
FIG. 1A
FIG. 1B
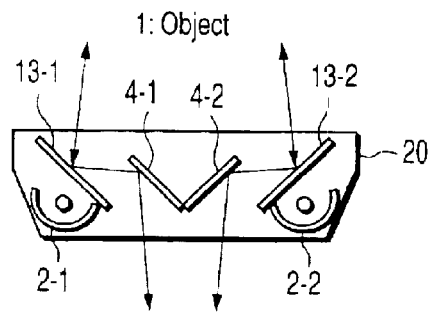
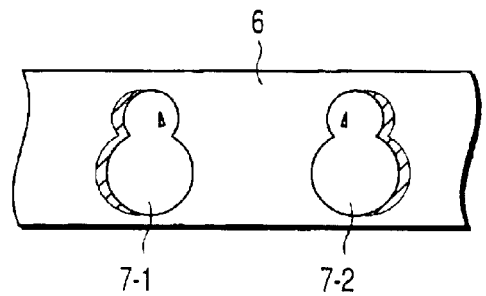
FIG. 2A
FIG. 2B
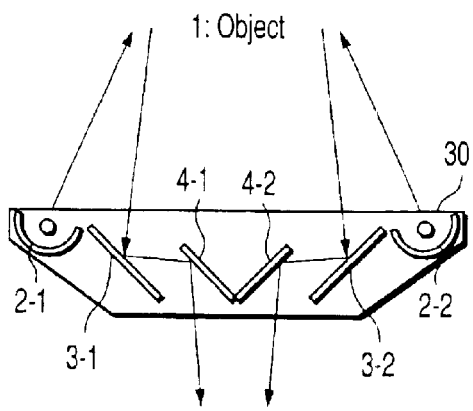
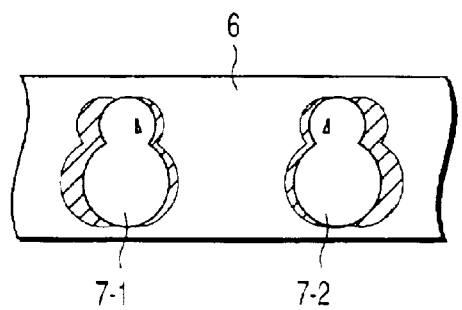
FIG. 3A
FIG. 3B

STEREOADAPTER, PATTERN PROJECTION ADAPTER, AND ADAPTER FOR LIGHT-EMITTING MEMBER

CROSS-REFERENCE TO RELATED APPLICATIONS

This application is based upon and claims the benefit of priority from the prior Japanese Patent Application No. 2001-34392, filed Feb. 9, 2001, the entire contents of which are incorporated herein by reference.

BACKGROUND OF THE INVENTION

The present invention relates to a stereo adapter, a pattern projection adapter and an adapter for a light-emitting module.

Various techniques are proposed for improving photographing of a parallax image.

Jpn. Pat. Appln. KOKOKU Publication No. 4-25758 discloses a technique for easily making a left parallax image correspond to a right parallax image by irradiating a specific pattern onto an object and photographing again the subject when sufficient correspondence of the photographed left parallax image and the photographed right parallax image cannot be obtained when parallax images of the object are photographed with two cameras. According to this technique, even if a surface of the object is simple and less pictorial characteristic portions utilized for making the left parallax image correspond to the right parallax image are provided, because a specific pattern is projected onto the surface of the object, the pictorial characteristic portions appear on the surface of the image. As a result, the correspondence between the parallax images can be easily obtained.

Jpn. Pat. Appln. KOKAI Publication No. 9-281614 discloses a stereo adapter which is placed in front of a lens of an ordinary camera and can photograph a parallax image by a mirror dividing a light ray. In accordance with this technique, the parallax image can be easily photographed by using an ordinary camera instead of a camera for photographing a parallax image.

However, in the above-described technique disclosed in Jpn. Pat. Appln. KOKOKU Publication No. 4-25758, two cameras and a pattern projection machine are required and the device becomes large. Thus it is difficult to actually apply this technique to somewhere other than a dedicated studio. Further, it is difficult for the timing for pressing the shutter release button of one camera to be synchronized with the timing for pressing the shutter release button of another camera. Moreover, pattern projection and flash illumination need to be performed at this synchronized timing. Accordingly, high speed synchronization is difficult. A process for determining whether correspondence of parallax images is easily performed is complicated.

In Jpn. Pat. Appln. KOKAI Publication No. 9-281614, since the adapter is disposed in front of the photographing device, when a flash or the like is used, the flash must be emitted at a position which is sufficiently spaced apart from the adapter so as not to form a shadow of the adapter. However, if the position of the flash is spaced apart from the adapter, the optical axis for photographing is largely apart from the direction of flash such that a shadow formed on the object by the flash light becomes large and the shadow becomes an obstruction on the image. In the adapter in particular, when the distance of base line is determined to be sufficiently large to improve a performance for identifying the distance on the basis of the parallax image or when photography is performed with larger angle of view, the size of the adapter must be large. Thus, the above-described problem with respect to the shadow is serious. When the technique disclosed in Jpn. Pat. Appln. KOKOKU Publication No. 4-25758 for projecting a pattern is applied to a camera with the adapter attached thereto, the same phenomena as the case of shadow formed by the flash light occurs at a time of projecting the pattern, and an area with the pattern not being projected is formed at the object.

BRIEF SUMMARY OF THE INVENTION

The present invention was developed in light of the above drawbacks, and the object thereof is to provide a stereo adapter, a pattern projection adapter and an adapter for a light-emitting module that an excellent parallax image can be photographed by using ordinary cameras.

In order to accomplish the aforementioned object, in accordance with a first aspect of the present invention, a stereo adapter which is mounted in front of an imaging optical system of a camera to photograph a parallax image comprises an optical system which has two light-receiving modules provided so as to be spaced apart from each other by a predetermined distance to receive light from the same object and which directs the received light from each of the two light-receiving modules to the imaging optical system of the camera; and a light-emitting module which is provided at a predetermined position associated with the optical system and can emit light to illuminate the object.

In accordance with a second aspect of the present invention, a stereo adapter which is mounted in front of an imaging optical system of a camera to photograph a parallax image comprises an optical system which has two light-receiving modules provided so as to be spaced apart from each other by a predetermined distance to receive light from the same object and which directs the received light from each of the two light-receiving modules to the imaging optical system of the camera; and a pattern projection section which is provided at a predetermined position associated with the optical system and projects a predetermined pattern onto the subject.

In accordance with a third aspect of the present invention, a stereo adapter which is mounted in front of an imaging optical system of a camera to photograph a parallax image comprises an optical system which has two light-receiving modules provided so as to be spaced apart from each other by a predetermined distance to receive light from the same object and which directs the received light from each of the two light-receiving modules to the imaging optical system of the camera; a light-emitting module which is provided at a predetermined position associated with the optical system and can emit light to illuminate the subject; a pattern projection section which is provided at a predetermined position associated with the optical system and projects a predetermined pattern onto the object; an input section which inputs a photographing timing signal from the camera; and a processing circuit which, in accordance with the input of the photographing timing signal, alternatively performs emission by the light-emitting module and pattern projection by the pattern projection section.

In accordance with a fourth aspect of the present invention, a pattern projection adapter which is mounted to a front surface of a light-emitting device used in relation to a camera to project a predetermined pattern onto a subject comprises a pattern filter which is placed so as to be adjacent to a light-emitting surface of the light-emitting device in a state of being mounted to the light-emitting device, and which has a predetermined pattern at an area through which light from the light-emitting device transmits; a projection optical system which receives the light transmitted through the pattern filter and projects the pattern; and a mounting member which detachably mounts the adapter to the light-emitting device of the camera.

In accordance with a fifth aspect of the present invention, an adapter for light-emitting module which is mounted to a front surface of a light-emitting module of a camera comprises a light beam dividing module which divides the light beam from the light-emitting module into two light beams; and a deflecting module which deflects each of the light beams from the light beam dividing module such that its proceeding direction direct to the same subject.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIGS. 1A and 1B are explanatory views of a stereo adapter according to a first structure of a first embodiment of the present invention.

FIGS. 2A and 2B are explanatory views of a stereo adapter according to a second structure of the first embodiment of the present invention.

FIGS. 3A and 3B are explanatory views of a stereo adapter according to a third structure of the first embodiment of the present invention.

DETAILED DESCRIPTION OF THE INVENTION

Figure 4A:
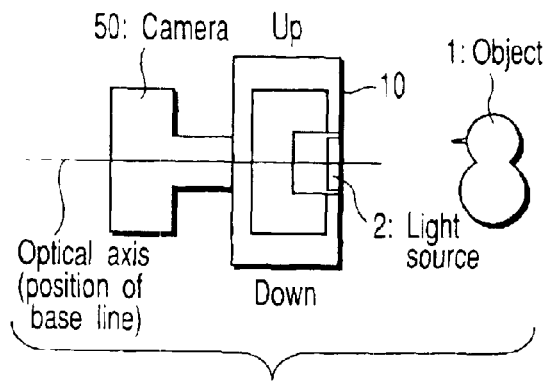
FIGS. 4A and 4B are views for explaining formation of shadow of parallax image when a light source 2 is placed at various positions in a vertical direction, and show a first example.

Hereinafter, embodiments of the present invention will be described in detail with reference to the drawings. In the following description, a stereo adapter which has two light-receiving modules, a light-emitting module and a pattern projection section at its front surface will be described. The light-emitting module illuminates a subject for photographing the same. The pattern projection module is used for the following purpose. Namely, if a surface of the object has no characteristic portions, it is difficult to make a left parallax image correspond to a right parallax image in a case of comparing the left parallax image to the right parallax image to obtain distance information. Thus, a predetermined pattern such as a random pattern or the like is projected onto the object such that a characteristic pattern appears on the surface of the object. As a result, it becomes easy to make the left parallax image correspond to the right parallax image.

In the present invention, it is important that a generated shadow (i.e., a portion onto which light or pattern generated at an image is not irradiated because the light or the pattern is intercepted by an object or the like) varies depending on positions of the light-emitting module and the pattern projection section. The important point of the present invention will be described with reference to FIG. 1A and subsequent figures. Variation of the shadow due to positional relationship with respect to the light-receiving module is the same as in cases of the light-emitting module and the pattern projection module. Accordingly, a light source will be described hereinafter as a representative of the light-emitting module and the pattern projection module.

Firstly, a description will be given of a first embodiment of the present invention. A stereo adapter according to the first embodiment relates to a stereo adapter which is mounted in front of an imaging optical system of a camera to photograph a parallax image.

FIGS. 1A and 1B are explanatory views of a stereo adapter 10 according to a first structure of the first embodiment of the present invention. As shown in FIG. 1A, the stereo adapter 10 is mounted in front of an imaging optical system 5 of a camera 11 and used to form parallax images 7-1 and 7-2 shown in FIG. 1B on a film 6. The stereo adapter 10 is provided with a single light source 2 such as a flash serving as a light-emitting module which can emit light to illuminate an object 1 and optical systems (mirrors 4-1 and 4-2) which receive the light from the object 1 at two light-receiving modules (mirrors 3-1 and 3-2) which are spaced apart from each other by a predetermined distance and direct the received light to the imaging optical system 5 of the camera 11.

Since the light source 2 is provided within the stereo adapter 10 as described above, a position of a view point can be made to be close to the position of the light source 2. Thus, the problem about the shadow of the subject 1 can be improved. Further, the problem about the shadow of the stereo adapter 10 itself can be eliminated. Since it suffices as one camera, synchronization of two cameras needs not to be performed.

In particular, when the single light source 2 is disposed between two light-receiving modules (two view points), a dense shadow (a black shadow portion shown in FIG. 1B) can be formed within an occlusion area caused by parallax.

FIGS. 2A and 2B are explanatory views of a stereo adapter 20 according to a second structure of the first embodiment of the present invention. As shown in FIG. 2A, the object 1 will be illuminated by using a pair of light sources 2-1 and 2-2 in the second embodiment. At this time, the light sources 2-1 and 2-2 are respectively disposed behind half mirrors 13-1 and 13-2 such that optical paths from the light sources 2-1 and 2-2 to the object 1 superpose optical paths from the object 1 to the half mirrors 13-1 13-2, respectively serving as a light-receiving module.

In the case of a structure with two view points, each of the light sources is disposed so as to be coaxial with each of the two view points. Accordingly, a half-shadow (a hatching portion in FIG. 2B) can be formed within the same range as the occlusion area as shown in FIG. 2B.

FIGS. 3A and 3B are explanatory views of a stereo adapter 30 according to a third structure of the first embodiment of the present invention.

As shown in FIG. 3A, in a third embodiment, a pair of light sources 2-1 and 2-2 are disposed outside optical paths from the subject 1 to mirrors 3-1 and 3-2 serving as light-receiving module. When the pair of light sources 2-1 and 2-2 are disposed outside two view points as described above, a half-shadow (a hatching portion in FIG. 3B) is formed outside the occlusion area as shown in FIG. 3B.

In the case of a projecting pattern such as random dots, because a pattern is projected onto entire visible region other than the occlusion area, coaxial illumination according to the second structure is most effective among the above described first through third structures.

Figure 4B:
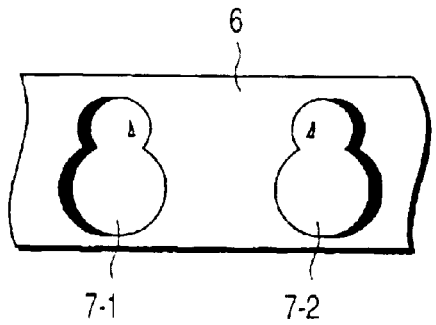
Figure 5A:
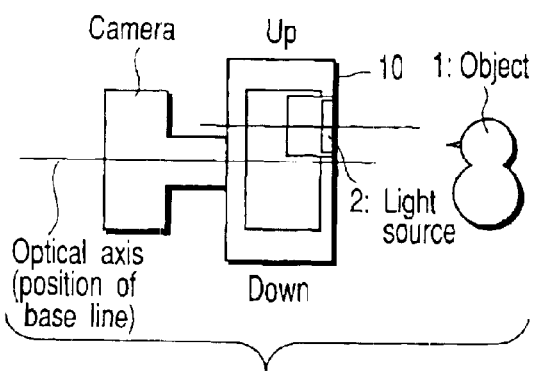
FIGS. 5A and 5B are views for explaining formation of shadow of parallax image when the light source 2 is placed at various positions in a vertical direction, and show a second example.
Figure 5B:
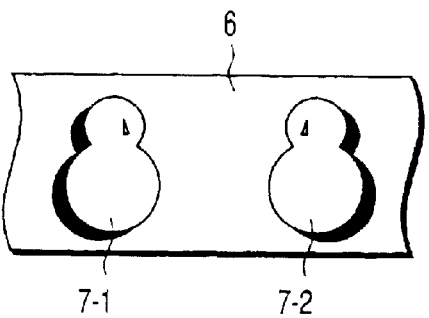
Figure 6A:
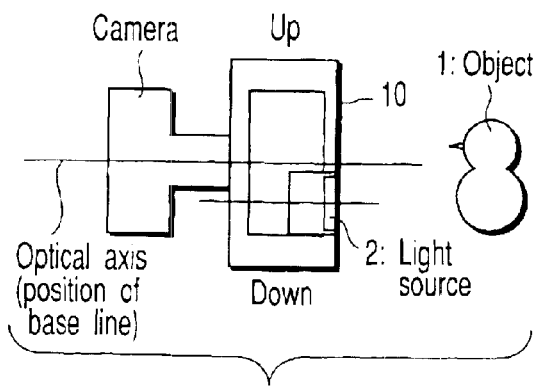
FIGS. 6A and 6B are views for explaining formation of shadow of parallax image when the light source 2 is placed at various positions in a vertical direction, and show a third example.
Figure 6B:
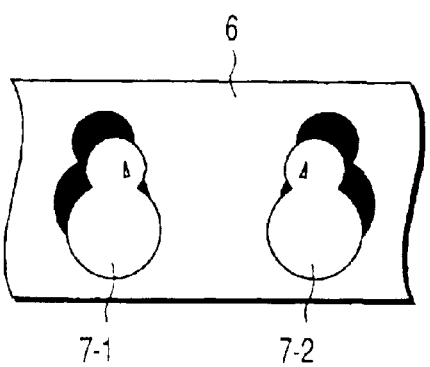

FIGS. 4A through 6B are views for explaining formation of shadow of parallax image at various positions in a vertical direction of the light source 2 in a case of single light source in the first structure described in FIGS. 1A and 1B. As shown in FIGS. 4A, 5A and 6A, the stereo adapter 10 is attached to a camera 50 and a subject is photographed. FIGS. 4B, 5B and 6B show images of the photographed object. As shown in FIG. 4A, when the light source 2 is disposed on the same axis as a base line, i.e., a base line which coincides an optical axis of the camera in a height direction in FIGS. 4A, 5a and 6A, a shadow (a black shadow portion in FIG. 4B) is formed only at the occlusion area in a base line length direction. This structure is the most preferable structure in a case of single light source.

As shown in FIG. 5A, when the light source 2 is disposed above the base line placed at the same position as the optical axis of the camera, a shadow (a black shadow portion in FIG. 5B) is formed downward so as to extend off the occlusion area.

As shown in FIG. 6A, when the light source 2 is disposed below the base line placed at the same position as the optical axis of the camera, a shadow (a black shadow portion in FIG. 6B) is formed upward so as to extend off the occlusion area.

In the case of a single light source, the structure shown in FIGS. 4A and 4B in which irradiation is performed on the base line such that the shadow area does not extend off the occlusion area is desirable. Here, when the subject is illuminated and pattern projection is performed, irradiation for illuminating the object and for pattern projection cannot be performed from the same position unless switching is performed by using a switching device or the like. However, this may complicate the device. If the photo-reality of the object is significantly into consideration, the light source for illumination is desirably disposed on or above the base line. When more types of patters need to be projected, a switching device may be used.

Figure 7:
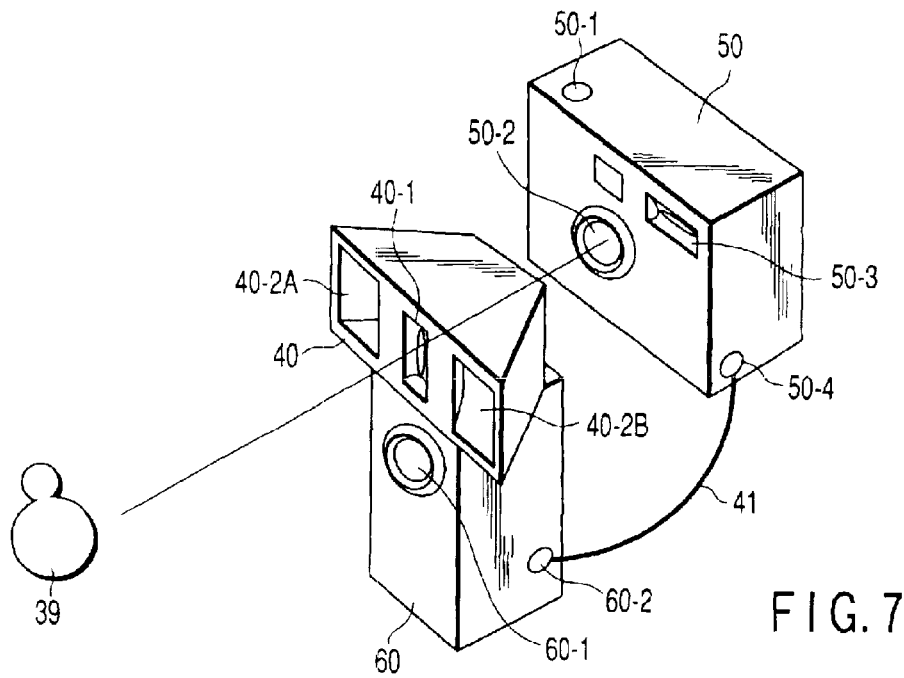
FIG. 7 is a view for explaining a second embodiment of the present invention.

FIG. 7 is a view for explaining a second embodiment of the present invention. A camera 50 comprises a release button 50-1, a photographing lens 50-2, a built-in flash 50-3 and a synchro contact 50-4. In a stereo adapter of the second embodiment, an illuminating device 40 is mounted on a pattern projection device 60. The pattern projection device 60 has a synchro input 60-2 which is possible to connect via a synchro cord 41 to the synchro contact 50-4 of the camera 50. Further, the pattern projection device 60 includes a light-emitting module for projecting a predetermined pattern and a pattern projection module therein, and the predetermined pattern is projected via a projection imaging lens 60-1 to an object 39. Moreover, the pattern projection device 60 includes therein electric sources and control circuits for the illuminating device 40 and the pattern projection device 60.

The illuminating device 40 includes a built-in flash 40-1 serving as a light-emitting module which can emit light for illuminating the object 39 and an optical system which receives the light from the object 39 at two light-receiving modules 40-2A and 40–2B spaced apart from each other by a predetermined distance to direct the received light to the photographing lens 50-2 of the camera.

Figure 8A:
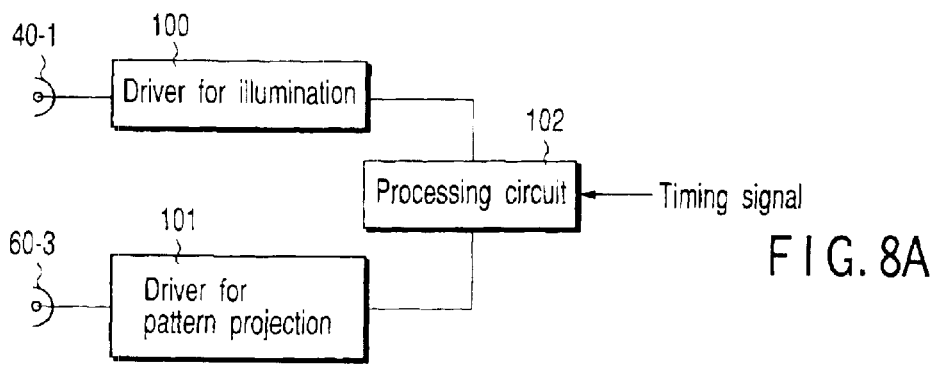
FIGS. 8A and 8B are views for explaining an operation of the second embodiment.

In the above-described structure, as shown in FIG. 8A, in response to the release button 50-1 of the camera 50 being pressed, a photographing timing signal is input from the camera 50 to the pattern projection device 60. A processing circuit 102 drives alternatively a driver 100 for illumination and a driver 101 for pattern projection each time the photographing timing signal is input so as to perform alternatively light emission of the built-in flash 40-1 of the illuminating device 40 and pattern projection due to light emission of a light-emitting module 60-3 of the pattern projection device 60.

Figure 8B:
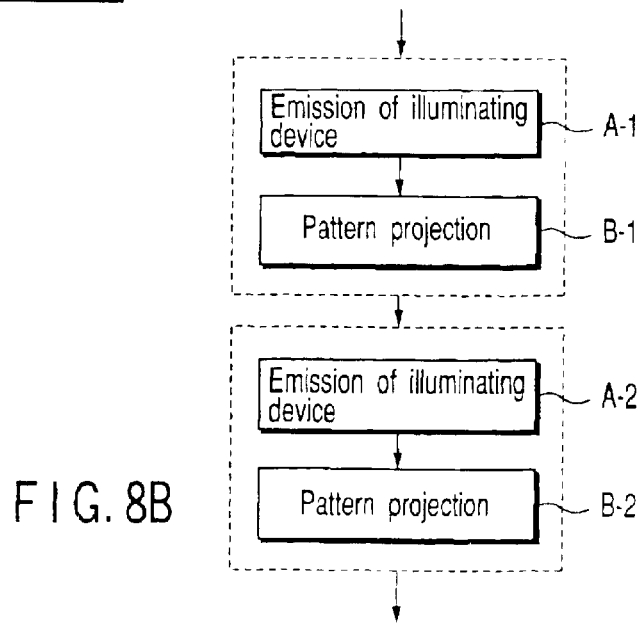

For example, as shown in FIG. 8B, subsequent to photographing a parallax image of the subject 39 by light emission (A-1) of the illuminating device 40, a parallax image of the object 39 is photographed by pattern projection (B-1) so as to obtain distance information. When a pattern is projected, the pattern appears on an image. Thus, ordinary photographing is performed in advance without using a pattern to obtain color tone of the subject or contrast information. Alternatively, pattern projection may be performed firstly and then the illuminating device 40 emits.

In the structure shown in FIG. 7, the light-emitting module (built-in flash 40-1) for illuminating the object is mounted on the pattern projection module. However, the present is not limited to such a structure, and an order of the pattern projection module and the light-emitting module or their positions may be changed in a direction vertical to the base line by a position changing mechanism.

Figure 9A:
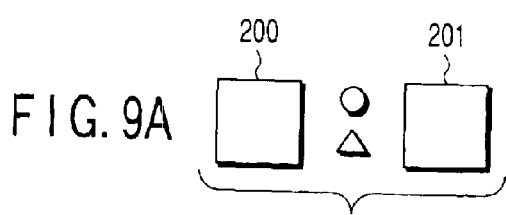
FIGS. 9A through 9G are views showing various modified examples with respect to an arrangement of a pattern projection section and a light-emitting module between light-receiving modules 200 and 201.
Figure 9B:
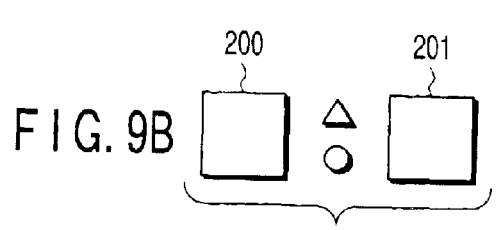
Figure 9C:
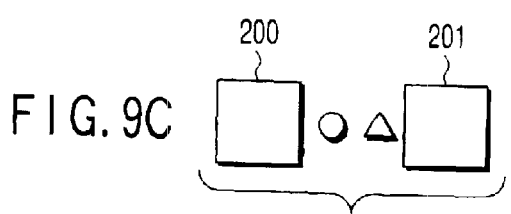
Figure 9D:
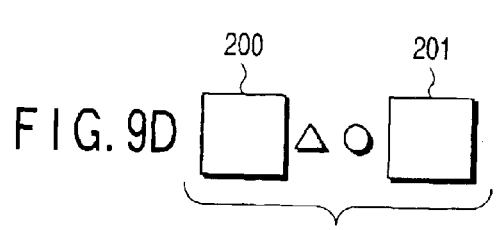
Figure 9E:
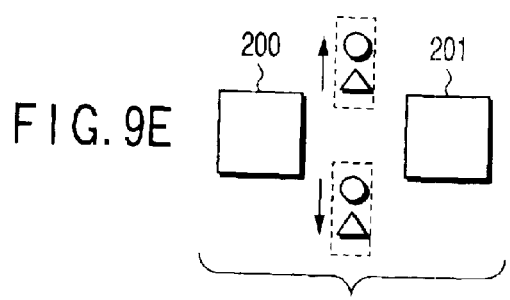
Figure 9F:
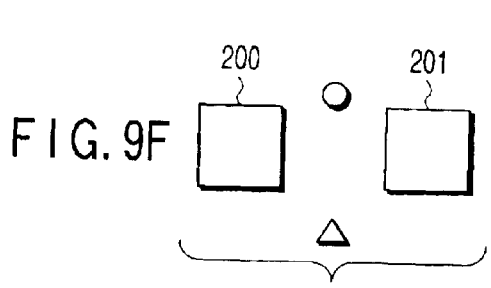
Figure 9G:
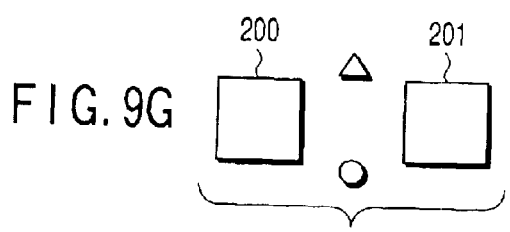

FIGS. 9A through 9G are views showing various modified examples with respect to an arrangement of the pattern projection section (indicated by ○ in the figures) and the light-emitting module (indicated by Δ in the figures) between the light-receiving module 200 and 201. FIGS. 9A and 9B are examples in which the pattern projection module and the light-emitting module for illumination are disposed in a vertical direction. FIGS. 9C and 9D are examples in which the pattern projection module and the light-emitting module for illumination are disposed in a horizontal direction. FIG. 9E is an example showing that the pattern projection module and the light-emitting module for illumination can move vertically. FIGS. 9F and 9G show examples in which the pattern projection section is disposed so as to be spaced apart from the light-emitting module for illumination.

Figure 10A:
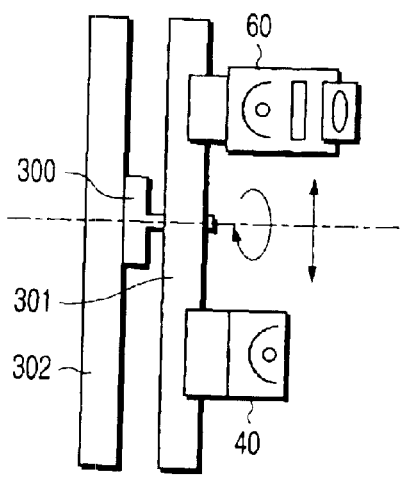
FIGS. 10A and 10B are views showing an example of a position changing mechanism to realize various modified examples shown in FIGS. 9A through 9G.
Figure 10B:
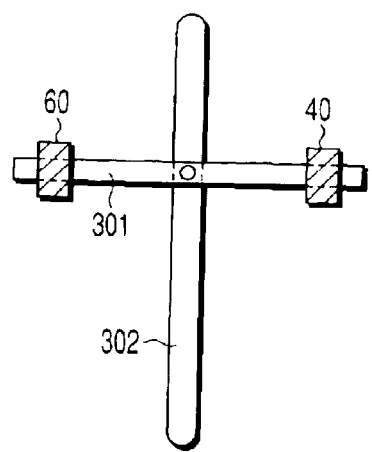

FIGS. 10A and 10B shows an example of a position changing mechanism for realizing various modified examples shown in FIGS. 9A through 9G. The pattern projection device 60 and the illuminating device 40 are mounted to a second rail 301 which can rotate 360° and is mounted to a rotational pivot 300 fixed to a first rail 302. Further, the pattern projection device 60 and the illuminating device 40 can slide on the second rail 301 such that a distance therebetween can be adjusted freely.

FIG. 10B shows a state in which the second rail 301 shown in FIG. 10A is rotated 90°.

By using the above-described position changing mechanism, it is possible to selectively perform illumination onto the image of the subject from upward so as to apply a natural shadow to the image or illumination onto the image of the subject from the base line to perform substantially shadowless illumination onto the subject (which is suitable for the case of adding a shadow information subsequent to construction of three-dimensional data). In this case, pattern projection is preferably performed from the base line.

When the illuminating device and the pattern projection device are disposed in tandem, in view of the above-described, it is also desirable to illuminate the subject from upward and to project the pattern on the subject from its front surface.

Figure 11:
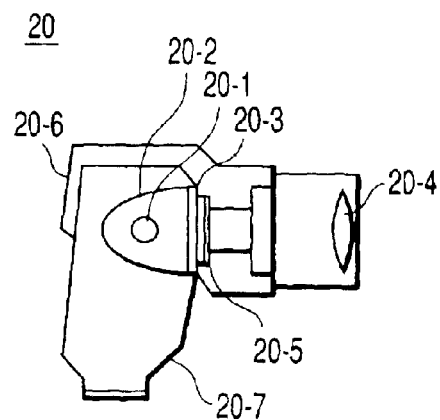
FIG. 11 is a view for explaining a third embodiment of the present invention.

FIG. 11 is a view for explaining a third embodiment of the present invention. An adapter of the third embodiment relates to a pattern projection adapter which is mounted to a front surface of a light-emitting device used for a camera to project a predetermined pattern onto a subject. The light-emitting device may be built into a camera or an adapter or may be provided separately from the camera or the adapter.

As shown in FIG. 11, the adapter includes a pattern filter (a pattern filter 20-5) which is placed in a vicinity of a light-emitting surface of a light-emitting tube 20-1 serving as the light-emitting module and has a predetermined pattern in an area through which the light from the light-emitting tube 20-1 transmits, a projection optical system (a projection lens 20-4) which receives the light transmitted through the pattern filter 20-5 and projects the pattern, and a mounting member (a mounting jig 20-6) which mounts detachably the adapter 20 to the light-emitting device of the camera. The light-emitting tube 20-1, a reflector 20-2 which reflects the light from the light-emitting tube 20-1 and a Fresnel plate 20-3 serving as a light outputting window construct an exterior flash 20-7. By utilizing such structure, pattern projection can be easily performed with normal commercially available cameras. An infrared reduction filter may be placed between the pattern filter 20-5 and the light-emitting tube 20-1. In this case, patterns may be formed by using a slide film which is easily damaged by heat but is inexpensive. The pattern filter preferably ensures nipping flatness by glass or the like.

Figure 12A:
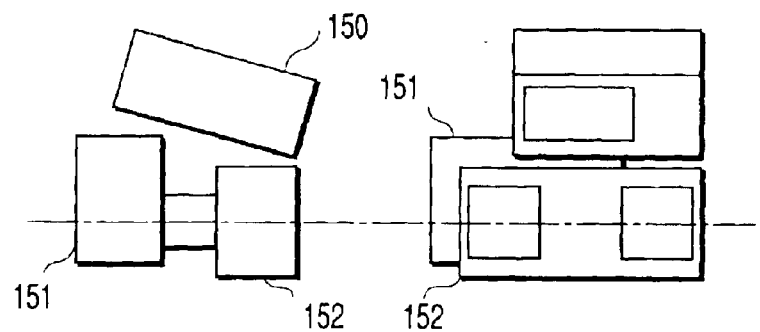
FIGS. 12A and 12B are views for explaining a fourth embodiment of the present invention.
Figure 12B:
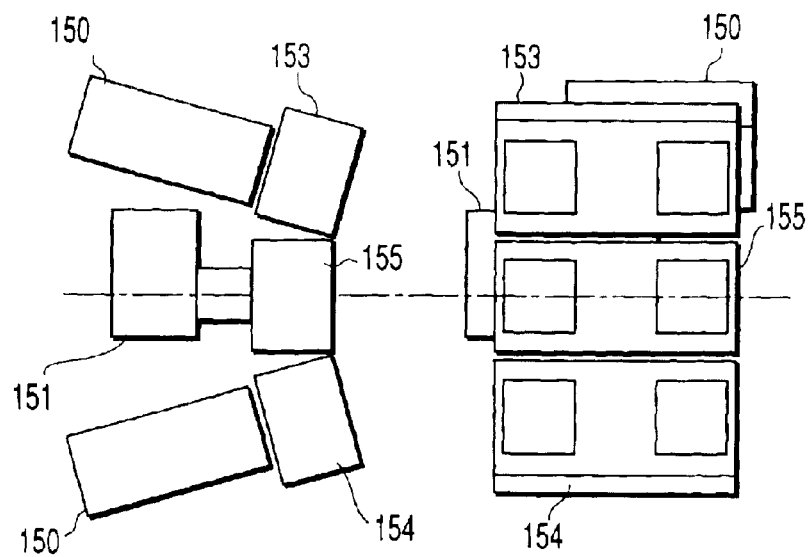

FIGS. 12A and 12B are views for explaining a fourth embodiment of the present invention. FIG. 12A shows a conventional structure. In FIG. 12A, a stereo adapter 152 is mounted in front of a camera 151. A flash 150 is mounted on the camera 151 and the stereo adapter 152.

FIG. 12B shows a structure of the fourth embodiment. A stereo adapter 155 for photographing a parallax image is placed in front of the camera 151. A stereo adapter 154 for pattern projection is mounted below the stereo adapter 155. A stereo adapter 153 for illumination is placed in front of the flash 150 serving as the light-emitting module. The flash 150 is placed above the camera 151. The stereo adapter 154 for pattern projection is placed below the stereo adapter 153 for illumination with the stereo adapter 155 for photographing a parallax image being placed therebetween.

The adapter 154 for pattern projection includes a pattern filter (a pattern film) having a predetermined pattern and a dividing mirror for dividing a light beam which has transmitted through the pattern film into two light beams. The dividing film can project divided light beams onto the same object from different positions.

The stereo adapter 153 for illumination includes a light beam dividing module for dividing light beam from the flash 150 into two light beams and a deflecting module (a mirror) which deflects the divided light beams so as to direct it to the same object. In the fourth embodiment, separate mirrors are used for stereo adapters. A large mirror may be shared by the adapter for illumination, the adapter for photographing parallax image and the adapter for pattern projection.

In the above-described embodiments, if a periodically repeated pattern is used as a pattern generated by the pattern filter, patterns having different periods may be incorrectly detected as patterns having the same period and corresponded with each other. Thus, patterns with no periodicity are preferably used. For example, a random pattern is preferable. Here, when a photographing distance is determined, a group of patterns that a pattern unit which has random property corresponding to a parallax width determined by the photographing distance is repeated in its base line direction may be used.

Figure 13A:
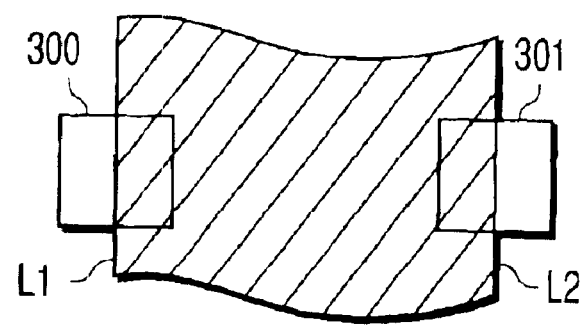
FIGS. 13A through 13C are views for explaining a position where a light-emitting module for illumination or a pattern projection module can be disposed.
Figure 13B:
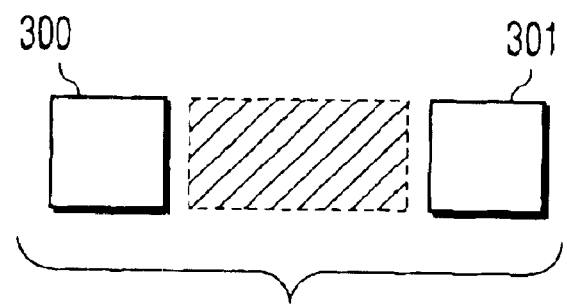
Figure 13C:
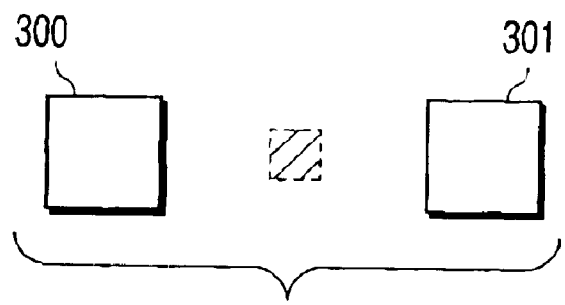

The most preferable position for disposing the light-emitting module for illumination according to the above-described embodiments is, but is not limited to, an intermediate position between two light-receiving modules as shown in FIG. 13C. For example, as shown in FIG. 13A, the position for disposing the light-emitting module for illumination may be any position in a space (a portion shown by hatching) defined by lines L1 and L2 which direct in a direction orthogonal to a base line passing through central portions of two light-receiving modules 300 and 301. Alternatively, as shown in FIG. 13B, the position for disposing the light-emitting module for illumination may be any position in a space (a portion shown by hatching) defined by two light-receiving modules 300 and 301. The positions shown in FIGS. 13A, 13B and 13C are preferable positions to dispose the light-emitting module for illumination. Even if the light-emitting module for illumination is disposed at a position other than the positions shown in FIGS. 13A through 13C, effects of the present embodiments can be obtained as long as the light-emitting module for illumination is disposed within the stereo adapter.

This description with respect to the arrangement of the light-emitting module for illumination is also applied to a case of disposing the pattern projection section.

Although a camera using a film has been described in the embodiments, a digital still camera which uses a photographing element or a video camera for animation may be used.

In accordance with the present invention, a stereo adapter, a pattern projection adapter and an adapter for light-emitting module which can photograph an excellent parallax image by using ordinary cameras can be provided.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A stereo adapter which is mounted in front of an imaging optical system of a camera to photograph a parallax image of object and an image including information on at least one of color tone and contrast of the object, the stereo adapter comprising:
    an optical system which has two light-receiving modules provided so as to be spaced apart from each other by a predetermined distance in a direction of a base line to receive light from the object and which direct the received light from each of the two light-receiving modules to the imaging optical system of the camera;
    a pattern projection module which projects a predetermined pattern onto the object when taking a photograph to obtain distance information on the object; and
    a light-emitting module which emits right for illuminating the object with light having no pattern when taking a photograph to obtain information one at least one of color tone and contrast of the object;
    wherein the light-emitting module d the pattern projection module are provided in a space between the two light-receiving modules such that a shadow of the object formed by light having no pattern from the pattern projecting module and shadow of the object formed by pattern projection from the pattern projecting module are formed in an occlusion area caused when the parallax image is photographed.

2. A stereo adapter according to claim 1, wherein said light-emitting module is disposed at an intermediate position between said two light-receiving modules.

3. A stereo adapter according to claim 1 further comprising a position changing mechanism which can support said light-emitting module and said pattern projection module in order for their order or positions to be varied in a direction orthogonal to the base line.

4. A stereo adapter according to claim 2, wherein the light-emitting module is provided on the base line or above the base line.

5. A stereo adapter according to claim 4, wherein the pattern module is provided below the light-emitting module.

6. A stereo adapter according to claim 1, wherein the pattern projection module is provided below the module.

7. A stereo adapter according to claim 2, wherein the pattern projection module is provided below the light-emitting module.

8. A stereo adapter according to claim 1 further comprising an inputting module for inputting a photographing timing signal from the camera.

9. A stereo adapter according to claim 9 further comprising a processing circuit which alternatively performs light emission by the light-emitting module and pattern projection by the pattern projection module in accordance with an input of the photographing timing signal to the inputting module.

10. A stereo adapter according to claim 1, wherein light emission by the light-emitting module and pattern projection by pattern projection module are performed alternatively.

* * * * *

UNITED STATES PATENT AND TRADEMARK OFFICE
CERTIFICATE OF CORRECTION

PATENT NO. : 6,862,410 B2  
DATED : March 1, 2005  
INVENTOR(S) : Takashi Miyoshi It is certified that error appears in the above-identified patent and that said Letters Patent is hereby corrected as shown below:

Column 9,  
Line 20, "right" should read -- light --  
Line 25, "d" should read -- and --

Signed and Sealed this

Twelfth Day of July, 2005

JON W. DUDAS  
*Director of the United States Patent and Trademark Office*